United States Patent [19]

Deters et al.

[11] Patent Number: 5,743,569
[45] Date of Patent: Apr. 28, 1998

[54] REPAIRABLE MOLDED-IN-PLACE HOSE CONNECTIONS

[75] Inventors: Dennis J. Deters, Ottawa; Phillip B. Meyer, Bowling Green, both of Ohio

[73] Assignee: Cooper Tire & Rubber Company, Findlay, Ohio

[21] Appl. No.: 730,075

[22] Filed: Oct. 15, 1996

[51] Int. Cl.$^6$ ............................................ F16L 33/207
[52] U.S. Cl. .................. 285/3; 285/4; 285/15; 285/133.11; 285/242
[58] Field of Search ...................... 285/3, 4, 15, 12, 285/242, 256, 156, 381.1

[56] References Cited

U.S. PATENT DOCUMENTS

| | | | |
|---|---|---|---|
| 3,185,500 | 5/1965 | Luther | 285/4 |
| 3,618,986 | 11/1971 | Todavich | 285/4 |
| 4,313,629 | 2/1982 | Winterhalter | 285/242 |
| 5,033,775 | 7/1991 | Matte et al. | 285/156 |
| 5,605,355 | 2/1997 | Andre | 285/3 |

*Primary Examiner*—Eric K. Nicholson
*Attorney, Agent, or Firm*—Joseph G. Nauman

[57] ABSTRACT

A frangible region is provided around at least one end of the outer connector part or cover of a hose and connector assembly, whereby a significant portion of such outer cover can be easily removed from the frangible connection to its end. This frees the end of the underlying hose to be removed from the inner connector part, a new hose part engaged over the exposed portion of the inner connector part, and a conventional clamp used to secure the new hose piece in place on the inner connector part. The outer jacket can be comprised of a plurality of bands, each band molded in place around a hose end, instead of a single piece outer jacket. The frangible region is created in the original molding process, and can, if desired, be formed on more than one of the ends of the outer molded connector part or the bands. The economics and durability of the original branched molded hose connection are still achieved, but the resulting connection can be repaired in the field, for example in site in the case of hoses used in automotive applications or hydraulic circuits using flexible hose. The frangible region is designed so as to direct and confine a breaking force applied to the outer connector part when it is desired to replace a hose piece.

2 Claims, 1 Drawing Sheet

REPAIRABLE MOLDED-IN-PLACE HOSE CONNECTIONS

FIELD OF THE INVENTION

The invention relates to devices used in connecting and joining a flexible hose, to another hose or a fitting particularly permanent attachment of one or more hoses and subsequent repair if one of the hoses becomes non-serviceable.

BACKGROUND OF THE INVENTION

Various forms of so-called branching hose connections have been developed, wherein hoses are joined by a molding process which forms a compressed permanent attachment of the ends of the hoses to a rigid connector element. Such connections, and the process of making them, are disclosed in U.S. Pat. No. 5,033,775 issued 23 Jul. 1991. The connections comprise relatively rigid molded-in-place inner and outer T-shaped or Y-shaped connector parts molded around and against the ends of two or more hoses while such hose ends are clamped in place. While the resultant connections are of superior strength and durability, when failure of one of the branched hoses occurs, it is necessary to replace the entire assemblage. This can be expensive, or inconvenient, or both, and an alternative manner of repair is needed. Often multiple hose systems, as in automotive or high pressure hydraulic devices, will exhibit a tendency for certain of the hoses to fail from exposure to heat, vibration, or corrosive elements. Thus it is possible in certain instances to predict the likely location where such repairs may be needed.

SUMMARY OF THE INVENTION

According to the invention, instead of a unitary outer jacket, one or more individual outer bands or retainers, are molded around one or more hose ends fitted onto a barbed end of an inner connector. These individual bands have been found to provide the necessary function of a complete, unitary, outer jacket, and may be molded in place simultaneously if desired.

This invention provides a frangible region in at least one of multi-piece outer connector part or jacket, and preferably in all of them, whereby a significant portion of the outer connector parts, e.g., the bands, can be easily removed from the frangible connection to its end. This frees the corresponding underlying hose to be removed from the inner connector part, a new hose part engaged over the exposed portion of the inner connector part, and a conventional clamp used to secure the new hose piece in place on the inner connector part.

The frangible region is created in the original molding process, and can, if desired, be formed on more than one of the ends of the outer molded connector part or cover. The economics and durability of the original branched molded hose connection are still achieved, but the resulting connection can be repaired in the field, for example at the site in the case of hoses used in automotive applications or hydraulic circuits using flexible hose. The frangible region may be a continuous external groove (or grooves) about the chosen end (or ends) of the outer connector part, so as to direct and confine a breaking force applied to the outer connector part when it is desired to replace a hose piece. It is also possible to form the frangible region as a series of radial openings in the chosen end of the outer connector part, such openings bridged by integral struts which extending across the resulting partial opening in the outer connector part.

DESCRIPTION OF PREFERRED EMBODIMENTS

Figure 1:
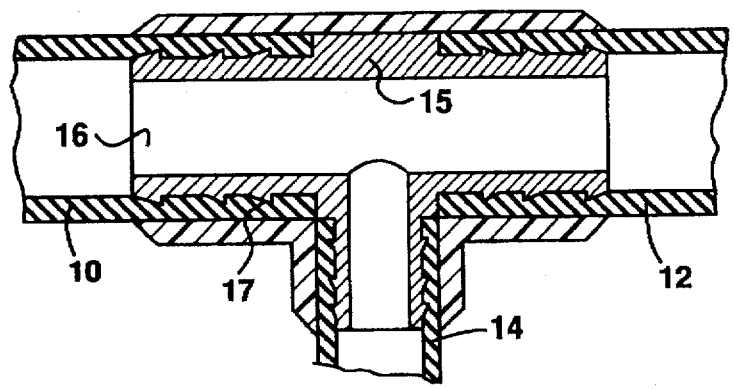
FIG. 1 shows a prior art molded-in-place T-connection for three hoses.

FIG. 1 shows a typical T-shaped connection between two lengths of flexible hose 10, 12, and a branch hose 14, such as described in aforementioned U.S. Pat. No. 5,033,775. Such a connection is representative of the prior art, and it is understood that the hoses could be of any desired number, and of different types or sizes (diameters) for use in a variety of fluid handling applications, and that the connection could be of different shapes and numbers of passages. The connection comprises a rigid inner connector 15 having a plurality of tubular ends 16, which preferably include ribs or annular barbs 17, onto which the ends of the hoses 10, 12 and 14 are fitted, and a rigid outer connector 18 molded in place about the inner connector 15 and assembled hose ends. Assuming, for example, that hose 12 fails, in the past the entire set of three hoses and connector must be replaced.

Figure 2:
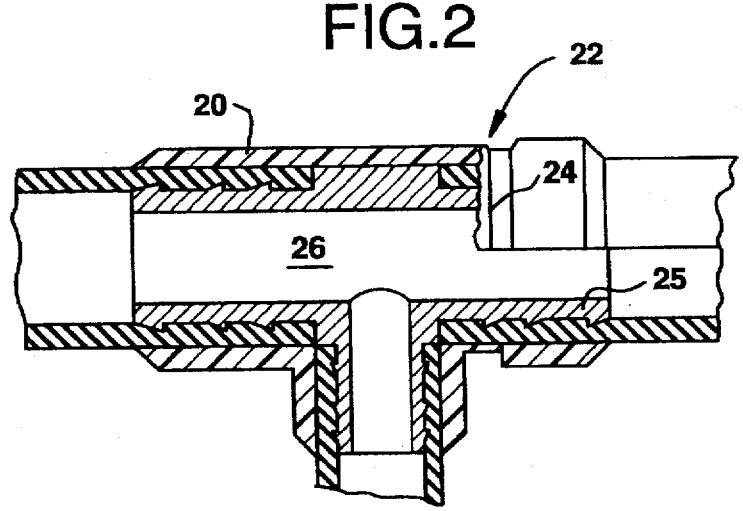
FIG. 2 shows one form of a modified outer molded connector according to the invention, containing a frangible region for directed separation of an end of the outer connector part.

According to the invention, and as shown in FIG. 2, one or more frangible sections are formed in the outer connector or cover 20, such frangible section being typically one or more radially extending holes or slots 22 extending partially or completely through the material of the band, so as to define a demarcation line or area 24 about which the band will fracture if a collapsing or cutting force is applied thereto. The region is designed to incorporate sufficient material that in normal use the connection functions as originally intended. The frangible section can be molded into any one or more ends of the outer cover 20, as may be desired or the frangible section can be molded into any or more of the bands comprising (or replacing) the outer cover, as may be desired. In general, such frangible sections would be located at the end of any hose which might be more likely subject to failure and so located in use as to be susceptible of repair, rather than replacement of the entire hose assembly.

Figure 4:
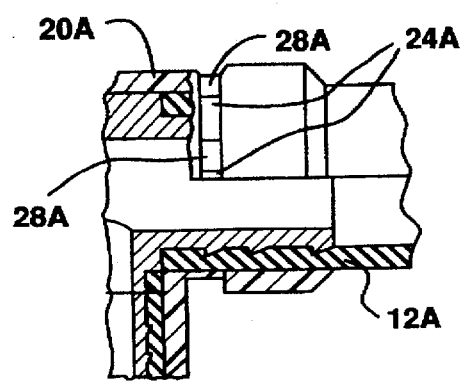
FIG. 4 shows the application of a new hose to one of the ends of the outer connector.

Thus, the cover 20 can be fractured at area 24, the parts between undercut 22 and the adjacent end of the cover can be removed to expose the end of the damaged hose 12 and facilitate its removal from the connector, and the underlying portion 25 of the inner connector part 26 is exposed so a new hose 12A can be substituted. The new hose can be attached to the inner connector part 26 with a standard hose clamp C as shown in FIG. 4.

Figure 3:
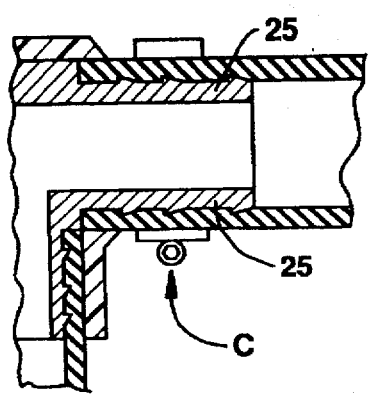
FIG. 3 shows details of one of the molded outer bands.

FIG. 3 shows details of a molded-in-place band 30 with a fracture directing hole 32. Such a band can be formed around as many of the hose ends as desired.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. In a connecting and/or branching device for use in a fluid system which comprises:

a rigid inner tubular connector having inner and outer surfaces, at least one flexible hose having a wall with inner and outer surfaces, and an end portion of the hose inner surface extending over an outer surface of said rigid inner tubular connector, and a substantially rigid outer cover band having an internal diameter which surrounds said end portion of said at least one flexible hose, said outer cover being made of an essentially rigid polymer molded about said hose end portion and contracted during cooling in place on the hose outer surface, providing a compressive action on said hose end to form a mechanical bonding between the at least one flexible hose and the rigid inner connector;

the improvement comprising a radially directed circular hole extending through said band to direct fracture thereof so as to provide a controlled breakage thereof which uncovers said end portion of said one hose for removal of said one hose from said rigid inner connector and placement of another hose onto said rigid inner connector, whereby a clamp can be attached to such other hose for forming a pressure seal to said rigid inner connector.

2. A plurality of flexible hoses each having inner and outer surfaces and having at one end thereof a connecting device comprising a rigid inner tubular connector having outer wall surface portions which extend along the inner surface of the ends of each of the flexible hoses to interconnect the interiors of said hoses, an integral molded outer cover applied to and mechanically compressing the ends of the flexible hoses on said outer surface portions of the rigid inner connector to provide a leakproof connecting devices the improvement comprising said cover being formed to include a plurality of bands of a moldable essentially rigid polymer different from the material of the outer surfaces of the flexible hoses, said bands having been injection molded over the ends of said flexible hoses to overlie the rigid inner connector, said bands contracting during cooling from its molding temperature to ambient temperature sufficiently to provide mechanical compressing action on an outer hose surface of each of said plurality of hoses, and a frangible section in at least one of said bands surrounding at least one of said hose end portions in the form of a annular demarcation of lesser thickness than said one band extending about said one hose end portion to direct fracture of said at least one band so as to provide a controlled breakage thereof which uncovers the associated said one hose end portion and separates said one band from said rigid inner connector for removal of said one hose end portion from its position on said rigid inner connector to allow placement of another hose onto said rigid inner connector.

* * * * *